United States Patent
Kovalcik et al.

(10) Patent No.: US 9,993,873 B2
(45) Date of Patent: Jun. 12, 2018

(54) SYSTEM AND METHOD FOR THREE-DIMENSIONAL PRINTING

(75) Inventors: Michael Andrew Kovalcik, Van Buren Township, MI (US); Eric Alan Estill, Morrow, OH (US); Donnell Eugene Crear, Belleville, MI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 725 days.

(21) Appl. No.: 13/477,775

(22) Filed: May 22, 2012

(65) Prior Publication Data
US 2013/0316081 A1 Nov. 28, 2013

(51) Int. Cl.
- *B05D 1/36* (2006.01)
- *B05C 5/02* (2006.01)
- *B22F 3/105* (2006.01)
- *B33Y 10/00* (2015.01)
- *B29C 67/00* (2017.01)
- *B33Y 50/02* (2015.01)
- *B33Y 30/00* (2015.01)

(52) U.S. Cl.
CPC ........ *B22F 3/1055* (2013.01); *B29C 67/0059* (2013.01); *B29C 67/0085* (2013.01); *B33Y 10/00* (2014.12); *B22F 2003/1056* (2013.01); *B33Y 30/00* (2014.12); *B33Y 50/02* (2014.12); *Y02P 10/295* (2015.11)

(58) Field of Classification Search
CPC ............. B29C 67/0059; B29C 67/0085; B22F 2003/1056; B22F 3/1055
See application file for complete search history.

(56) References Cited

U.S. PATENT DOCUMENTS

| | | | |
|---|---|---|---|
| 2007/0075460 A1* | 4/2007 | Wahlstrom et al. | 264/401 |
| 2010/0100222 A1* | 4/2010 | Skubic et al. | 700/110 |
| 2010/0191360 A1* | 7/2010 | Napadensky | B29C 67/0059 700/98 |

FOREIGN PATENT DOCUMENTS

JP 05318607 A * 12/1993

OTHER PUBLICATIONS

Goss et al., "Thin-Filament Pyrometry: A Novel Thermometric Technique for Combusting Flows," The American Society of Mechanical Engineers, Jun. 8, 1988.
Bandyopadhyay et al., "Processing of Piezocomposites by Fused Deposition Technique," IEEE 1996.
Kuhn et al., "Soot and Thin-Filament Pyrometry Using a Color Digital Camera," The Combustion Institute, Elsevier Aug. 6, 2010.
3D Systems to Unveil Project 5000 Large Format 3D Printer, 2010 Akela Ltd., http://www.akelaltd.com/page23.html.

* cited by examiner

*Primary Examiner* — Alexander M Weddle
(74) *Attorney, Agent, or Firm* — GE Global Patent Operation; John P. Darling

(57) ABSTRACT

A system and method for three-dimensional printing are provided. One three-dimensional printing system includes a first printing surface configured to hold a first three-dimensional object. The three-dimensional printing system also includes a second printing surface configured to hold a second three-dimensional object. The three-dimensional printing system includes at least one printing head disposed adjacent to the first and second printing surfaces for printing the first and second three-dimensional objects. A vertical position of the first printing surface is controlled independently from a vertical position of the second printing surface.

19 Claims, 7 Drawing Sheets

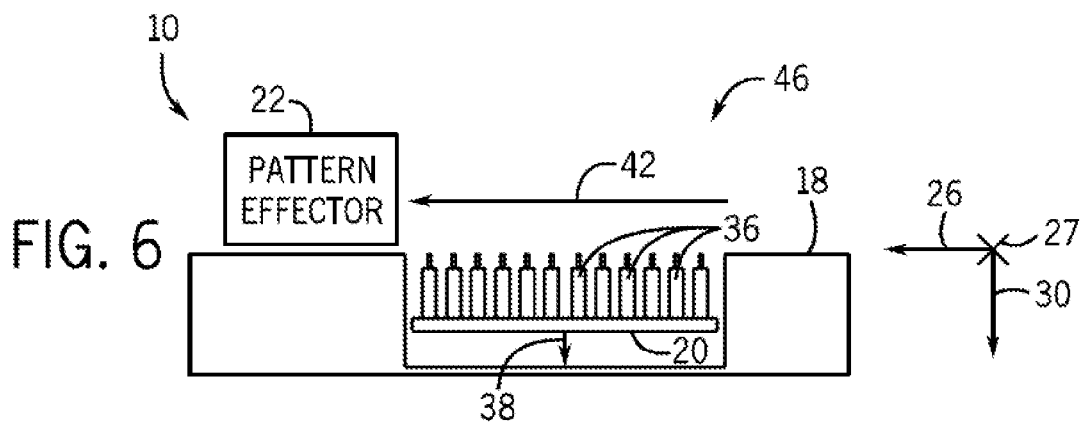
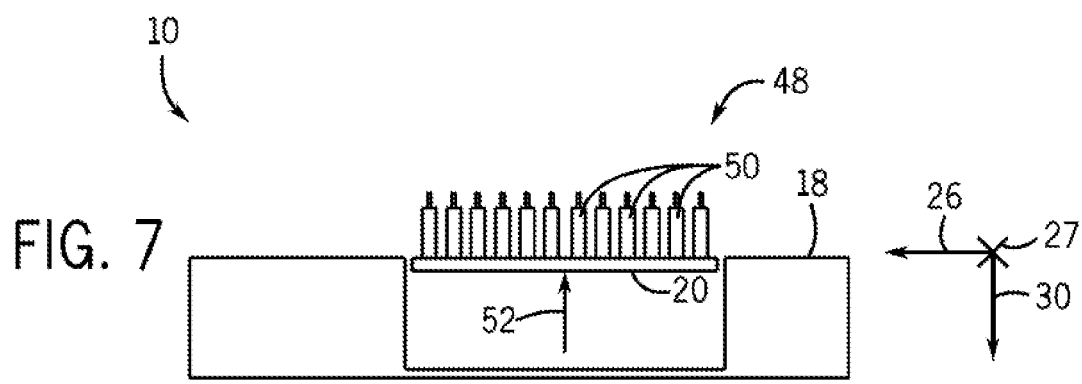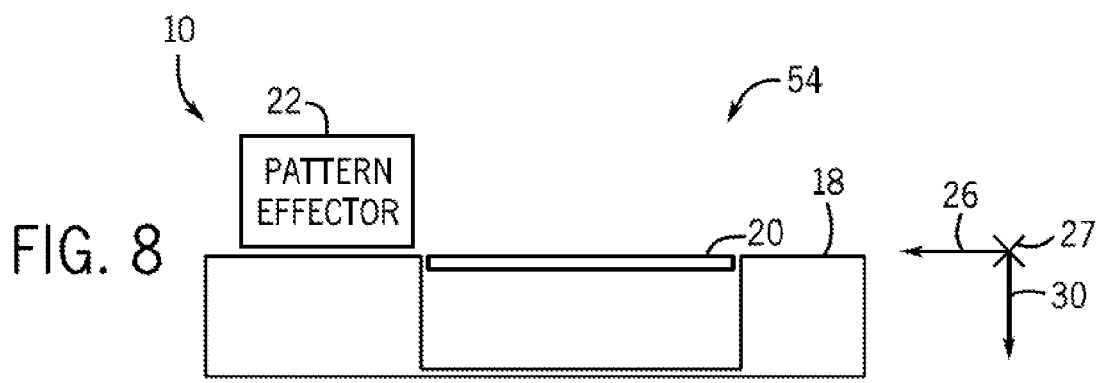

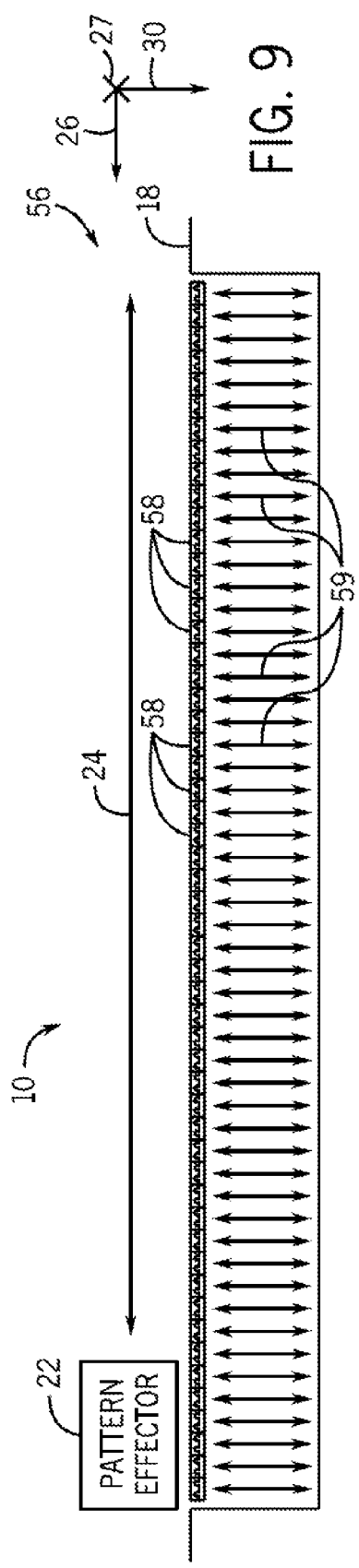
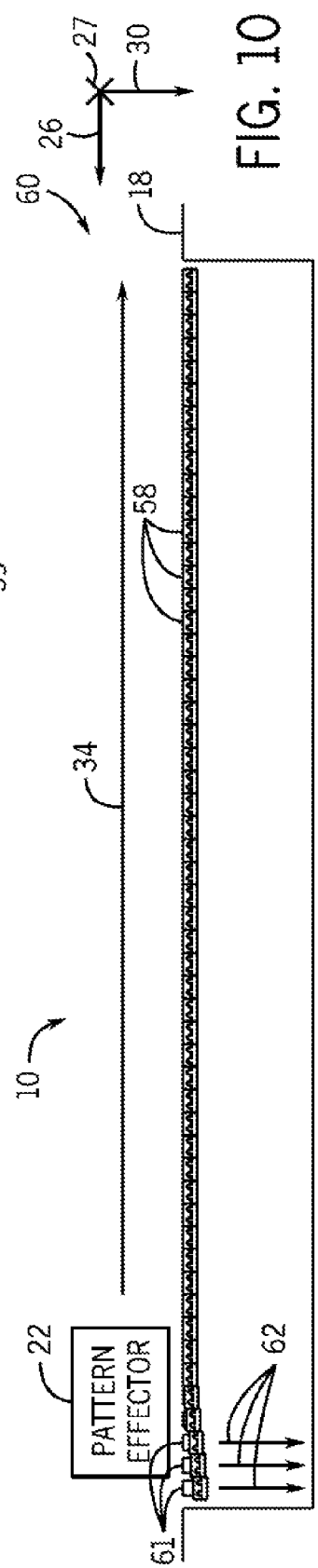
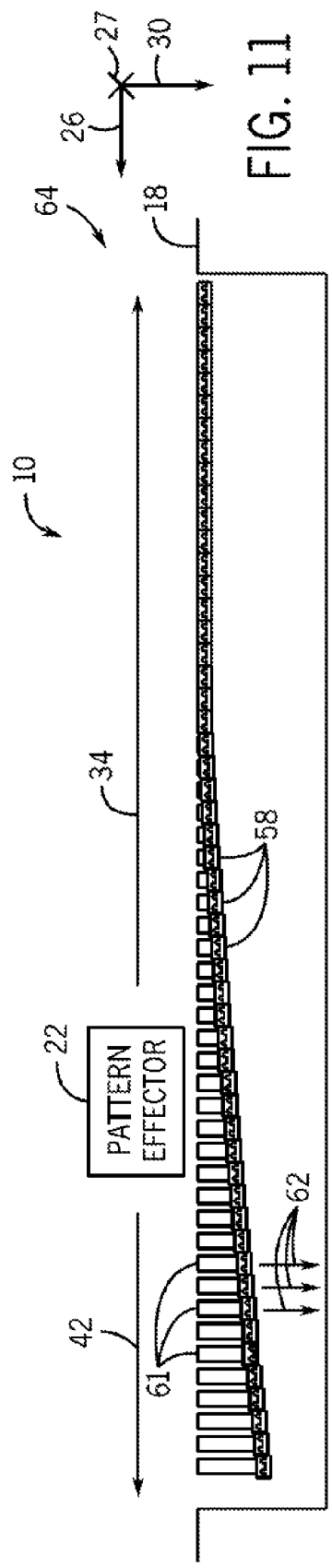

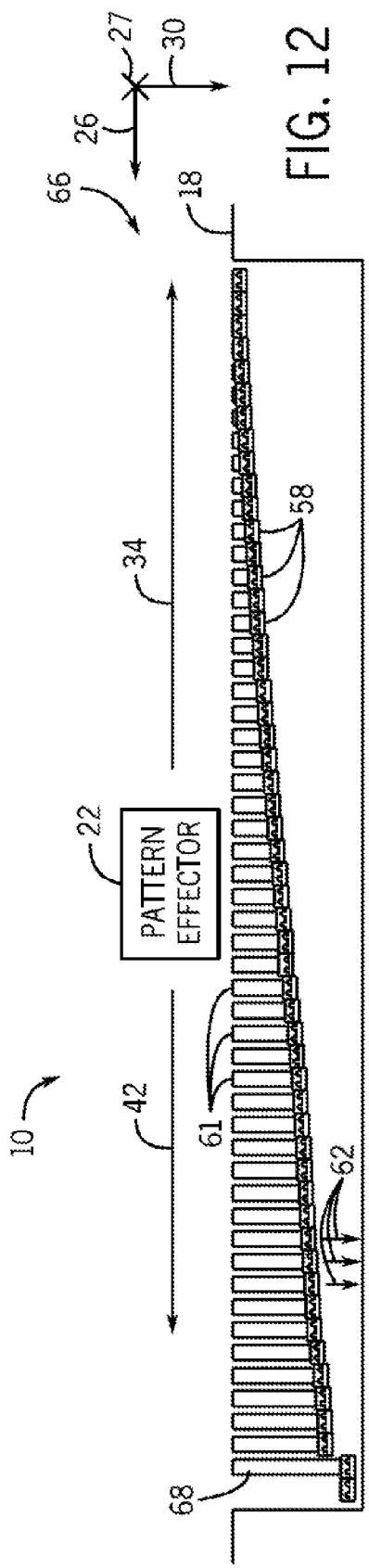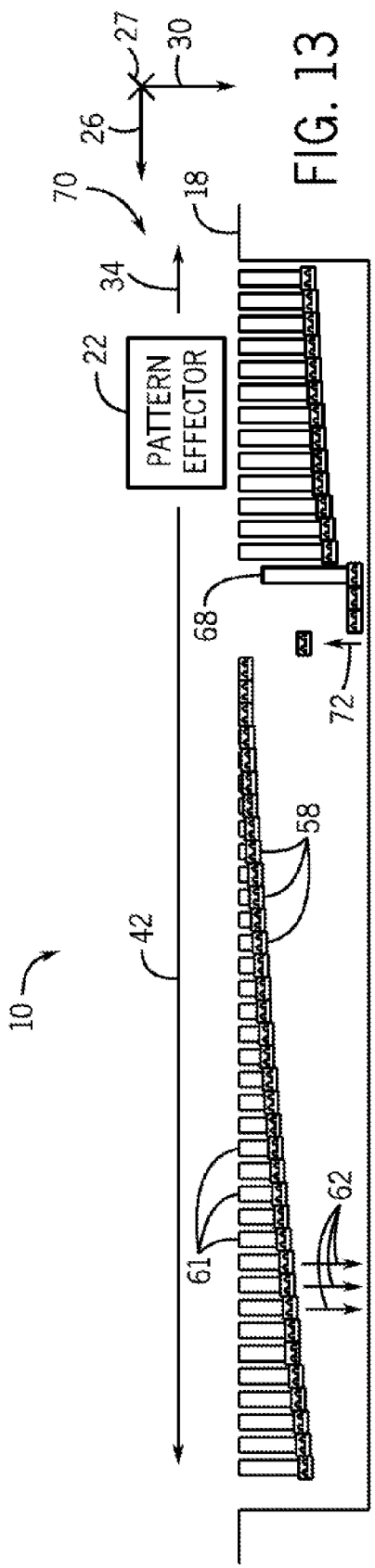

SYSTEM AND METHOD FOR THREE-DIMENSIONAL PRINTING

BACKGROUND

The subject matter disclosed herein relates to printing and, more particularly, to a system and method for three-dimensional printing.

A three-dimensional (3D) solid object may be formed using an additive manufacturing process (e.g., 3D printing). In such a process, the 3D object may be formed by applying successive layers of material using a pattern effector (e.g., mobile, stationary). For example, layers of liquid material may be deposited and cured in a predetermined orientation that forms a 3D object via the stacking of these layers. To create a specific 3D object, the pattern effector may apply the layers of liquid material based on a digital model of the 3D object. In certain 3D printing machines, multiple 3D objects may be formed together as a batch. The batch of 3D objects may take a long time to process (e.g., 48 hours, 96 hours). After the batch of 3D objects is formed, defects in the 3D objects of the batch may be detected. As will be appreciated, such defects may be present in multiple 3D objects in the batch. These manufacturing defects may result in a formed product being unusable or unacceptable for its intended purpose.

BRIEF DESCRIPTION

In accordance with one embodiment, a three-dimensional printing system is provided. The three-dimensional printing system includes a first printing surface configured to hold a first three-dimensional object. The three-dimensional printing system also includes a second printing surface configured to hold a second three-dimensional object. The three-dimensional printing system includes at least one printing head disposed adjacent to the first and second printing surfaces for printing the first and second three-dimensional objects. A vertical position of the first printing surface is controlled independently from a vertical position of the second printing surface.

In accordance with another embodiment, a method for printing a plurality of three-dimensional objects is provided. The method includes printing a first three-dimensional object on a first printing surface of a three-dimensional printing machine. The method also includes printing a second three-dimensional object on a second printing surface of the three-dimensional printing machine. The method includes independently controlling a vertical position of the first printing surface relative to a vertical position of the second printing surface while printing the first and second three-dimensional objects.

In accordance with a further embodiment, a three-dimensional printing machine is provided. The three-dimensional printing machine includes a plurality of printing surfaces configured to hold a plurality of three-dimensional objects. The three-dimensional printing machine also includes a plurality of height adjustment devices coupled to the plurality of printing surfaces. Each of the plurality of height adjustment devices is configured to adjust a vertical position of a corresponding printing surface. The three-dimensional printing machine includes at least one printing head disposed adjacent to the plurality of printing surfaces for printing the plurality of three-dimensional objects. The three-dimensional printing machine also includes a control system configured to control the plurality of height adjustment devices, and to control the at least one printing head.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a block diagram of an embodiment of a fifth step in the process of FIG. 2 for manufacturing multiple 3D objects;

FIG. 7 is a block diagram of an embodiment of a sixth step in the process of FIG. 2 for manufacturing multiple 3D objects;

FIG. 8 is a block diagram of an embodiment of a seventh step in the process of FIG. 2 for manufacturing multiple 3D objects;

FIG. 9 is a block diagram of an embodiment of a first step in a process for manufacturing multiple 3D objects using multiple independently controllable printing surfaces;

FIG. 10 is a block diagram of an embodiment of a second step in the process of FIG. 9 for manufacturing multiple 3D objects using multiple independently controllable printing surfaces;

FIG. 11 is a block diagram of an embodiment of a third step in the process of FIG. 9 for manufacturing multiple 3D objects using multiple independently controllable printing surfaces;

FIG. 12 is a block diagram of an embodiment of a fourth step in the process of FIG. 9 for manufacturing multiple 3D objects using multiple independently controllable printing surfaces;

FIG. 13 is a block diagram of an embodiment of a fifth step in the process of FIG. 9 for manufacturing multiple 3D objects using multiple independently controllable printing surfaces;

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
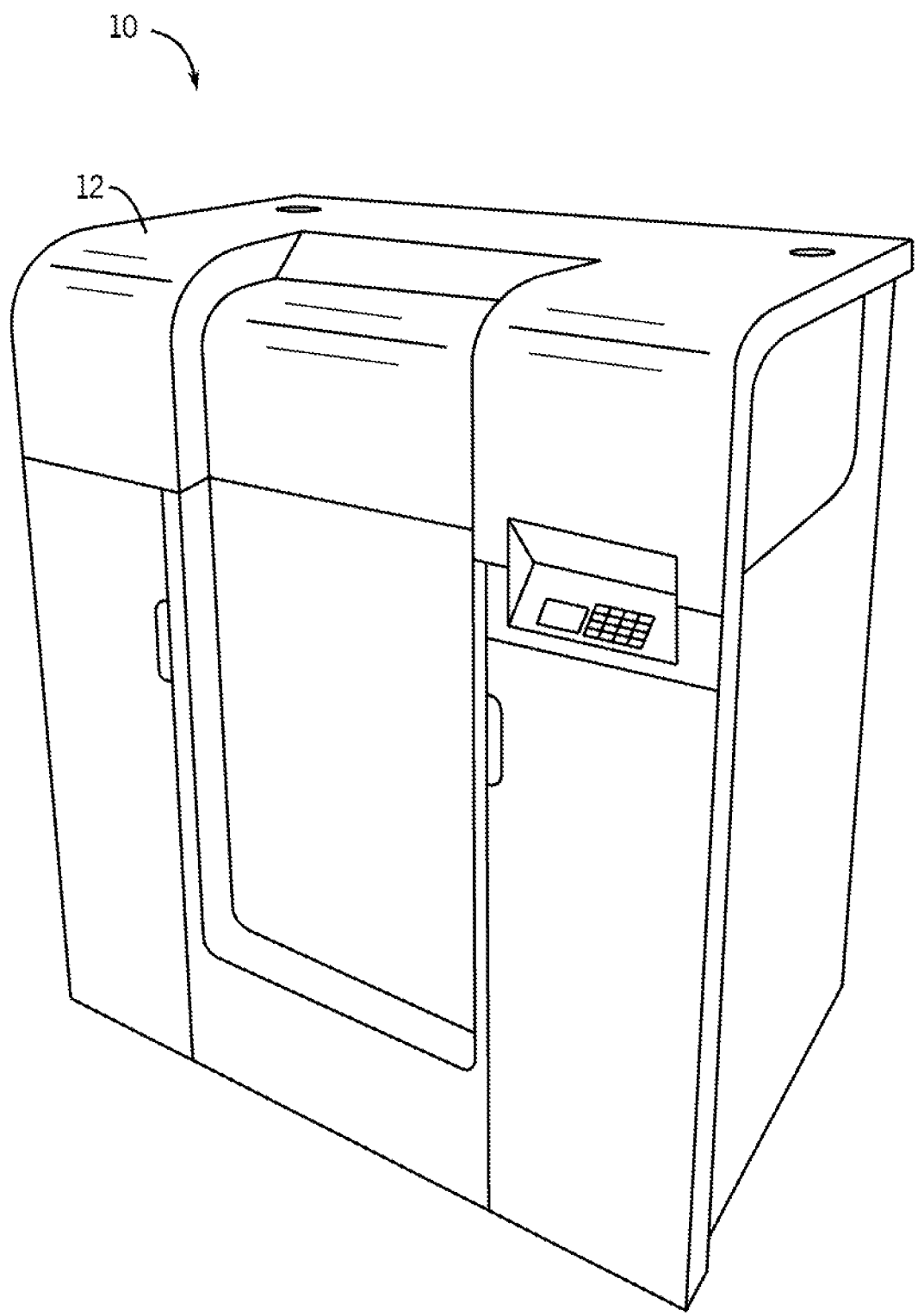
FIG. 1 is a perspective view of an embodiment of a three-dimensional (3D) printing system which may employ multiple independently controllable printing surfaces.

FIG. 1 is a perspective view of an embodiment of a three-dimensional (3D) printing system 10 which may employ multiple independently controllable printing surfaces. The 3D printing system 10 forms a 3D object by depositing layers of material on a printing surface, which is used to hold the 3D object. Furthermore, the 3D object is formed within a housing 12 of the 3D printing system 10. In certain embodiments, the 3D printing system 10 may include multiple independently controllable printing surfaces to enable staggered printing of multiple 3D objects, as will be explained in detail below. By having multiple independently controllable printing surfaces, 3D objects may be completed one at a time at predetermined intervals instead of being completed together in one batch. Therefore, if defects occur in some 3D objects, the defects may be detected and prevented from occurring in other 3D objects. Accordingly, wasted material and production time may be reduced.

Figure 2:
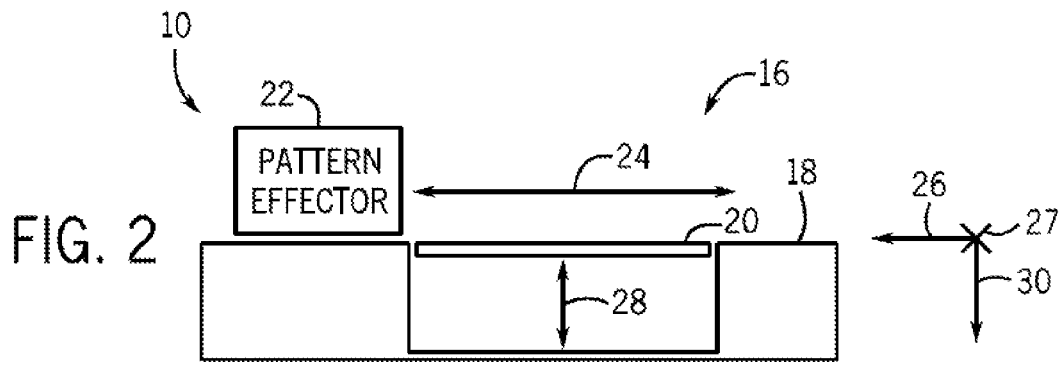
FIG. 2 is a block diagram of an embodiment of a first step in a process for manufacturing multiple 3D objects.

FIGS. 2 through 8 illustrate one embodiment of steps for manufacturing multiple 3D objects within the 3D printing system 10. Specifically, FIG. 2 is a block diagram of an embodiment of a first step 16 in a process for manufacturing multiple 3D objects. The 3D printing system 10 includes a non-printing surface 18, and a printing surface 20 (e.g., build plate). To form the 3D objects, a pattern effector 22 (e.g., a mobile pattern effector) travels above the printing surface 20 as illustrated by arrow 24. Specifically, the pattern effector 22 travels along an x-axis 26 and a y-axis 27 to deposit material for forming the 3D objects. After a layer of material is deposited on the printing surface 20, the printing surface 20 is moved vertically as illustrated by arrow 28 (e.g., along a z-axis 30).

Figure 3:
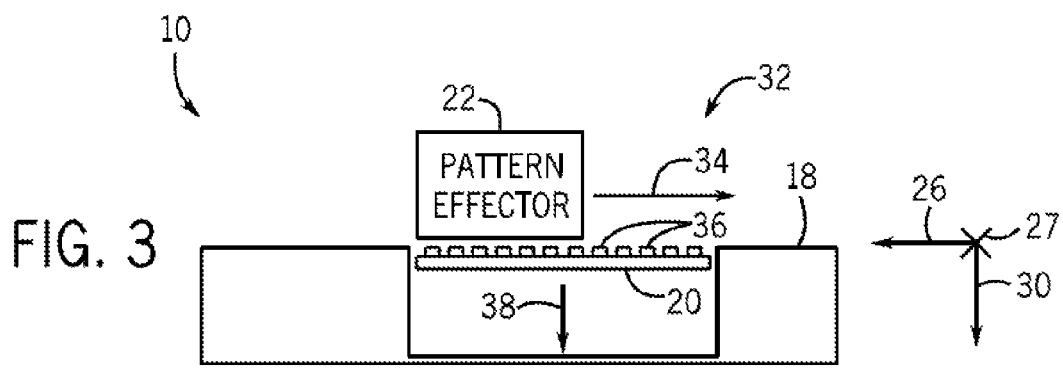
FIG. 3 is a block diagram of an embodiment of a second step in the process of FIG. 2 for manufacturing multiple 3D objects.

In a second step 32 illustrated by FIG. 3, the pattern effector 22 moves across the printing surface 20 as shown by arrow 34. As the pattern effector 22 passes over the printing surface 20, a layer of material is deposited (e.g., printed), thereby beginning formation of the 3D objects. A partial buildup 36 of the multiple 3D objects is illustrated. After the pattern effector 22 has formed a layer of material over the printing surface 20, the printing surface 20 is moved vertically downward as shown by arrow 38.

Figure 4:
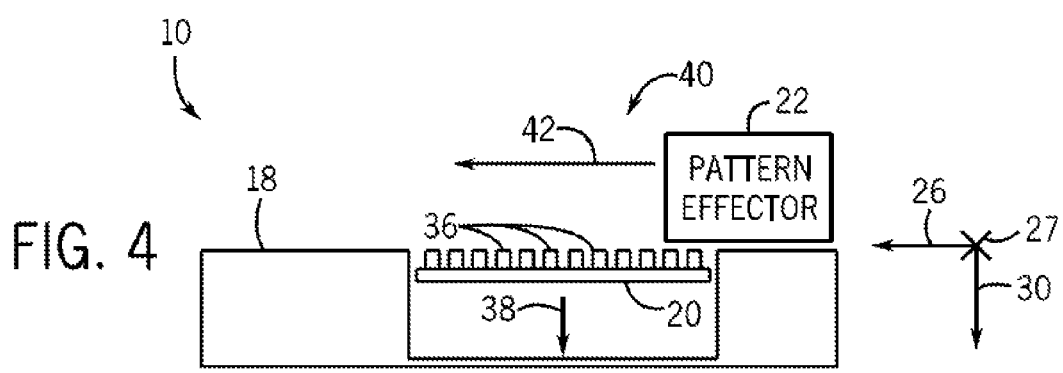
FIG. 4 is a block diagram of an embodiment of a third step in the process of FIG. 2 for manufacturing multiple 3D objects.
Figure 5:
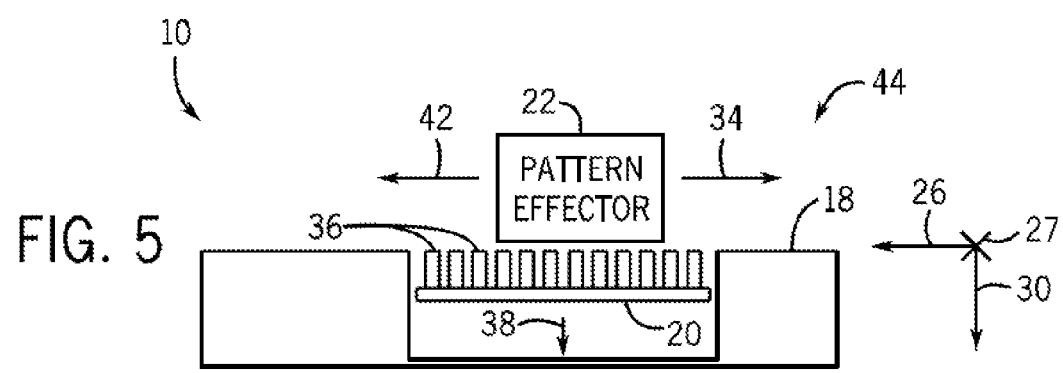
FIG. 5 is a block diagram of an embodiment of a fourth step in the process of FIG. 2 for manufacturing multiple 3D objects.

In a third step 40 illustrated by FIG. 4, the pattern effector 22 moves back across the printing surface 20 as shown by arrow 42. Again, after the pattern effector 22 has formed a layer of material over the printing surface 20, the printing surface 20 is moved vertically downward as shown by arrow 38. In a fourth step 44 illustrated by FIG. 5, the second step 32 and the third step 40 are repeated, with the pattern effector 22 moving back and forth over the printing surface 20 as shown by arrows 34 and 42. The printing surface 20 continues to move vertically downward as shown by arrow 38 until the 3D objects are completely formed.

FIG. 6 illustrates a fifth step 46 in the process for manufacturing multiple 3D objects. In the fifth step 46, the pattern effector 22 forms a final layer of material over the partial buildup 36 of the multiple 3D objects. Furthermore, in a sixth step 48 illustrated by FIG. 7, multiple 3D objects 50 are completed. After being completed, the printing surface 20 is moved vertically upward as shown by arrow 52. As illustrated in FIG. 8, during a seventh step 54, the 3D objects 50 are removed from the printing surface 20 and the 3D printing system 10 is prepared for printing more 3D objects.

Using the process described in FIGS. 2 through 8, multiple 3D objects may be formed in a single batch. As discussed in detail below, the 3D printing system 10 may include multiple printing surfaces 20 to reduce waste, and to stagger the timing of 3D objects being produced. Furthermore, in certain embodiments, waste may be reduced by including multiple pattern effectors 22 in the 3D printing system 10. For example, the 3D printing system 10 may include one pattern effector 22 for each 3D object to be formed. Such embodiments may obviate problems that exist in single surface systems. For example, in certain configurations 3D objects are started and finished together. Accordingly, the 3D printing system 10 may output a complete batch of 3D objects at one time. As such, there may be long delays (e.g., the time it takes to form the batch) between the completion of each batch. For example, one batch may be completed every 48 hours. As another example, one batch may be completed every 96 hours. Furthermore, with multiple 3D objects output in a single batch, it may be difficult to use (e.g., install in another system, package for shipment, test, etc.) all of the 3D objects at the time they are output. As such, some 3D objects may have to be set aside until they are used. Moreover, large amounts of waste may be generated if a batch has 3D objects formed incorrectly. For example, a problem with one 3D object formed in a batch may also be present in other 3D objects formed in the same batch.

FIGS. 9 through 13 illustrate one embodiment of steps for manufacturing multiple 3D objects using multiple independently controllable printing surfaces. Specifically, FIG. 9 is a block diagram of an embodiment of a first step 56 in a process for manufacturing multiple 3D objects using multiple independently controllable printing surfaces. The 3D printing system 10 includes the non-printing surface 18 and multiple printing surfaces 58 (e.g., build plates). To form the 3D objects, the pattern effector 22 travels above the printing surfaces 58, as illustrated by the arrow 24. Specifically, the pattern effector 22 travels along the x-axis 26 and the y-axis 27 to deposit material for forming the 3D objects. After a layer of material is deposited over at least a portion of the printing surfaces 58, one or more of the printing surfaces 58 may move vertically, as illustrated by arrows 59 (e.g., along the z-axis 30).

In a second step 60, as illustrated by FIG. 10, the pattern effector 22 moves across the printing surfaces 58, as illustrated by the arrow 34. After the pattern effector 22 passes over the printing surfaces 58, a layer of material is deposited, thereby beginning formation of the 3D objects. As will be appreciated, the pattern effector 22 may deposit a layer of material on one or more of the printing surfaces 58 to form partial buildups 61. For example, with one pass over the printing surfaces 58, the pattern effector 22 may deposit a layer of material on only one printing surface 58. With another pass over the printing surfaces 58, the pattern effector 22 may deposit a layer of material on only two printing surfaces 58. Further, with another pass over the printing surfaces 58, the pattern effector 22 may deposit a layer of material on all of the printing surfaces 58. Each of the printing surfaces 58 is configured to move along the z-axis 30 independently of the other printing surfaces 58, as shown by arrows 62. Using the independently controllable printing surfaces 58, the 3D printing system 10 may stagger the deposition of layers of material to begin forming 3D objects on the printing surfaces 58 at different times. Accordingly, the 3D printing system 10 may complete 3D objects at different times. As such, the 3D printing system 10 may be configured to form one 3D object at predetermined time intervals. Accordingly, the 3D objects may be inspected at various stages while being formed. Defects may be detected during any stage of forming the 3D objects. After detecting a defect in a 3D object, only the 3D objects that have already passed the defective stage will contain the defect. In certain embodiments, the digital 3D model used to form the 3D objects may be modified so that 3D objects being formed that have not reached the defective stage may be modified so the defect is not reproduced (e.g., the defective stage is changed so that it is not defective).

In a third step 64, as illustrated by FIG. 11, the pattern effector 22 moves back and forth across the printing surfaces 58, as shown by arrows 34 and 42. Again, after the pattern effector 22 has formed each layer of material over the printing surfaces 58, at least a portion of the printing surfaces 58 are moved vertically downward, as shown by arrows 62. In a fourth step 66, as illustrated by FIG. 12, the pattern effector 22 finishes a 3D object 68. The completed 3D object 68 may be removed from the 3D printing system 10, and the 3D printing system 10 may continue forming the other 3D objects. In certain embodiments, the completed 3D object may be removed from the 3D printing system 10 by a machine (e.g., a robotic arm). Furthermore, the 3D printing system 10 may start forming a new 3D object over the printing surface 58 where the completed 3D object 68 was removed. Thus, staggering the printing of 3D objects may be continued. In a fifth step 70, as illustrated by FIG. 13, a printing surface 58 may be returned to an initial position, as shown by arrow 72, to begin forming another 3D object on the printing surface 58. In certain embodiments, the printing surface 58 may be removed with the 3D printing object. Accordingly, before beginning the formation of a new 3D object, a new printing surface 58 may be disposed into the 3D printing system 10.

As will be appreciated, at any time during steps 56, 60, 64, 66, and/or 70 a partial buildup 61 that is being formed incorrectly (e.g., with defects) may be removed from the 3D printing system 10, and the printing surface 58 that corresponds to the removed partial buildup 61 may be reset to begin forming a new 3D object. The incorrect formation of the partial buildup 61 may be due to a defect in the digital 3D model used to form the 3D object. Therefore, the defect may become apparent after the portion containing the defect is formed. In certain embodiments, an incorrectly formed partial buildup 61 may be detected by visual inspection. In other embodiments, an incorrectly formed partial buildup 61 may be detected using visual and/or mechanical sensors. A detected defect may affect a limited number of partial buildups 61 (e.g., only the partial buildups 61 that have formed the defective portion). As such, the 3D printing system 10 may be configured to suspend printing of the 3D objects so that defective partial buildups 61 may be removed from the system 10 and their buildup restarted. Furthermore, the digital 3D model used to form the 3D objects may be modified to remove the defective portions. After such actions occur, the printing of the 3D objects may be resumed. Accordingly, fewer 3D objects with defects may be produced, resulting in less wasted materials and lower manufacturing cost.

Figure 14:
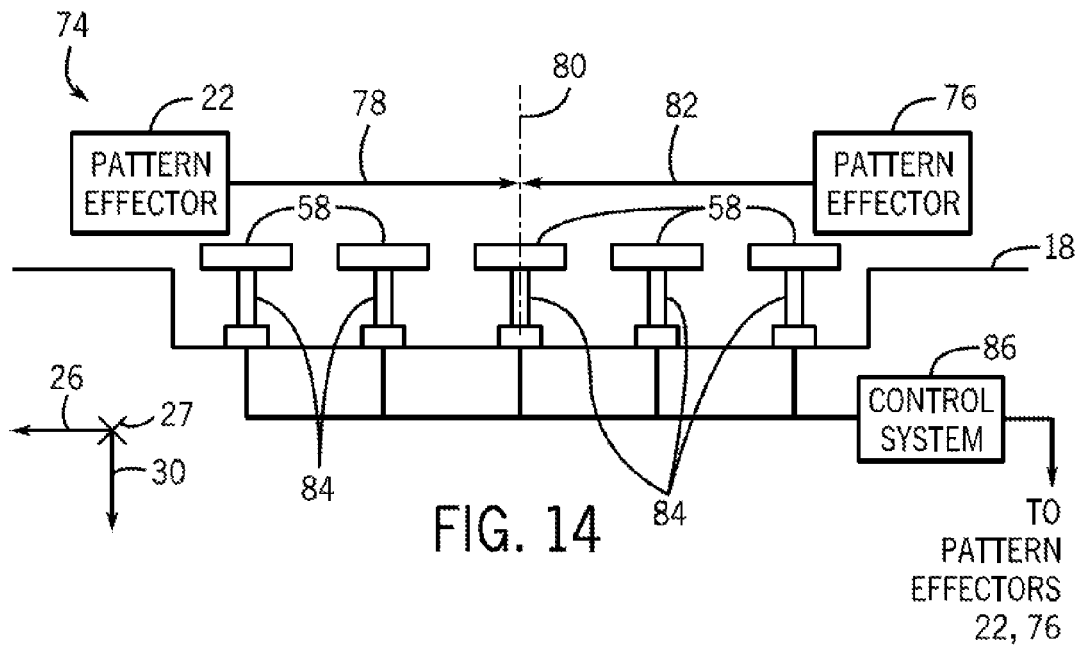
FIG. 14 is a block diagram of an embodiment of a 3D printing system having multiple independently controllable printing surfaces.

FIG. 14 is a block diagram of an embodiment of a 3D printing system 74 having multiple independently controllable printing surfaces 58. In the present embodiment, the 3D printing system 74 includes the first pattern effector 22 and a second pattern effector 76. The pattern effectors 22 and 76 are configured to deposit layers of material on one or more printing surfaces 58. For example, the first pattern effector 22 may be configured to deposit layers of material on printing surfaces 58 on a first side 78 of the 3D printing system 74 (e.g., relative to a division 80). In addition, the second pattern effector 76 may be configured to deposit layers of material on printing surfaces 58 on a second side 82 of the 3D printing system 74.

Each of the printing surfaces 58 may be configured to move vertically up and down along the z-axis 30 via an independently controllable height adjustment device 84 coupled to each of the printing surfaces 58. The independently controllable height adjustment devices 84 may include any suitable device for moving the printing surfaces 58 vertically. For example, an independently controllable height adjustment device 84 may include an actuator, a motor, a hydraulic device, a pneumatic device, an electric device, and so forth.

The 3D printing system 74 also includes a control system 86 communicatively coupled to the independently controllable height adjustment devices 84, and/or to the pattern effectors 22 and 76. The control system 86 may be configured (e.g., programmed, designed) to control the thickness and/or timing of the deposition of material by the pattern effectors 22 and 76. Furthermore, the control system 86 may also be configured to control the magnitude and/or timing of the vertical movement of the printing surfaces 58 (e.g., by controlling the independently controllable height adjustment devices 84). In certain embodiments, the control system 86 may be programmed with digital 3D models that are used to form the 3D objects. The control system 86 may also be configured to receive a production timeline relating to produce the 3D objects at a predetermined frequency. Accordingly, the control system 86 may control the production of the 3D objects based on the 3D models and the production timeline. For example, the control system 86 may be configured to stagger the printing of 3D objects to complete printing of multiple 3D objects at different times. As another example, the control system 86 may be configured to print 3D objects on multiple printing surfaces 58 at the same time (e.g., start all 3D objects at the same time, finish all 3D objects at the same time). As a further example, the control system 86 may be configured to restart printing of a 3D object when programmed and/or requested to do so (e.g., after a completed 3D object has been removed from the system 10). With such a system, each 3D object may be produced by the 3D printing system 74 at an adjustable and/or desirable rate. Accordingly, 3D objects may be completed one at a time at predetermined intervals instead of being completed together in one batch. Therefore, if defects occur in some 3D objects, the defects may be detected and prevented from occurring in other 3D objects. Moreover, wasted material and production time may be reduced.

Figure 15:
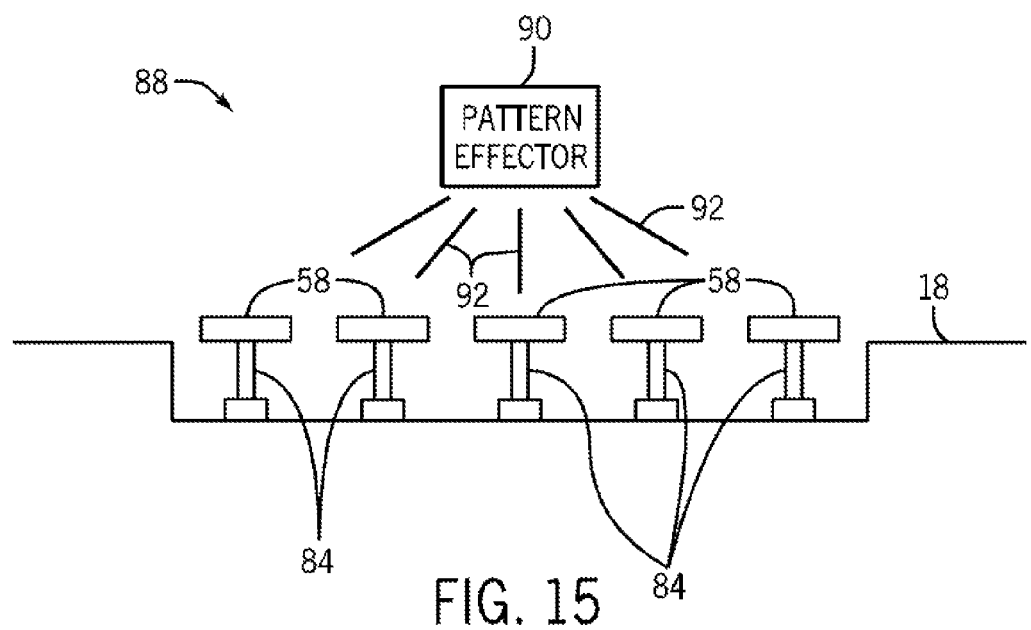
FIG. 15 is a block diagram of an embodiment of a 3D printing system having a stationary pattern effector.

FIG. 15 is a block diagram of an embodiment of a 3D printing system 88 having a stationary pattern effector 90. The stationary pattern effector 90 remains in one place (e.g., does not move) while forming a 3D object using emissions 92 (e.g., via a laser). For example, the stationary pattern effector 90 may use stereolithography (SLA) or selective laser sintering (SLS). In such applications, the stationary pattern effector 90 may use a laser to "draw" a pattern on a liquid and/or a powder.

Figure 16:
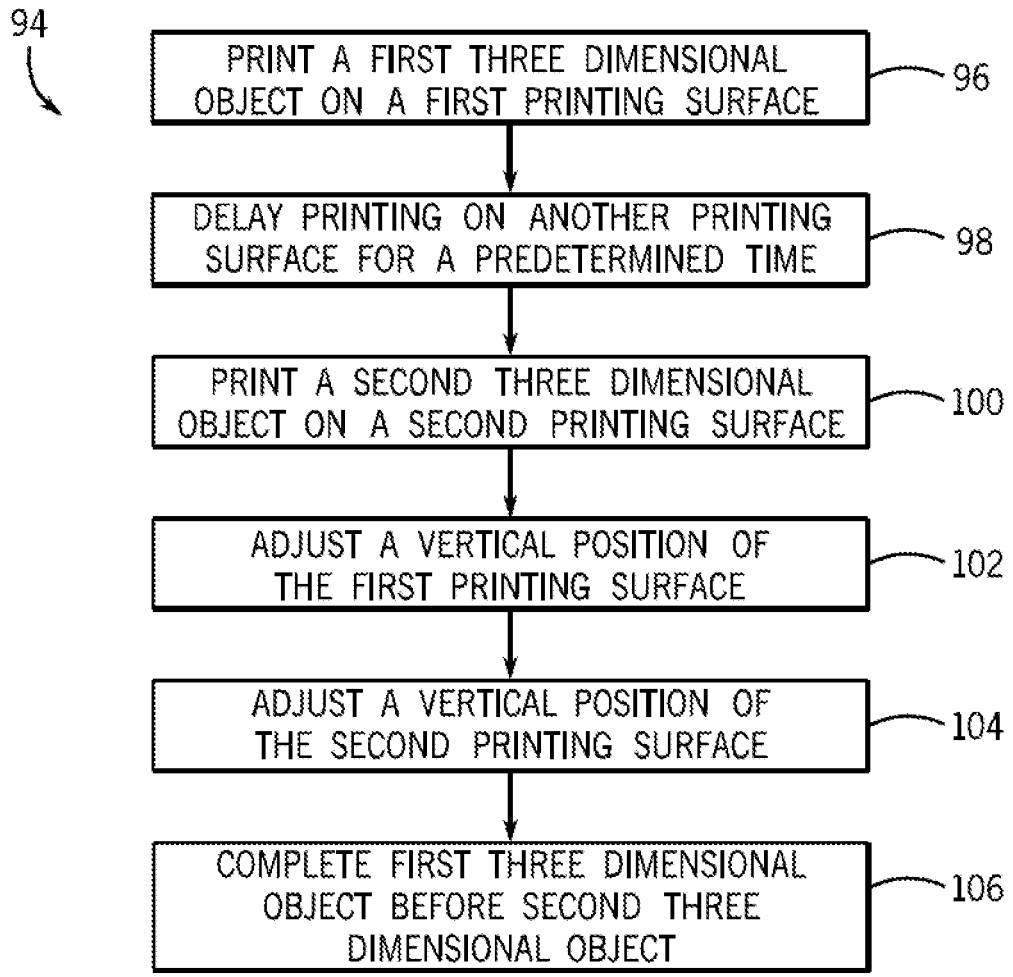
FIG. 16 is a flow chart of an embodiment of a method for printing multiple 3D objects.

FIG. 16 is a flow chart of an embodiment of a method 94 for printing multiple 3D objects. At block 96, the 3D printing system 10 prints a first 3D object on a first printing surface 58 (e.g., build plate). Then, at block 98, the 3D printing system 10 delays printing a 3D object on another printing surface 58 for a predetermined time (e.g., a total build time of one 3D object divided by a total number of printing surfaces 58). Next, at block 100, the 3D printing system 10 prints a second 3D object on a second printing surface 58.

At block 102, the 3D printing system 10 adjusts a vertical position of the first printing surface 58. Then, at block 104, the 3D printing system 10 adjusts a vertical position of the second printing surface 58. Accordingly, via blocks 102 and 104 the vertical position of the first printing surface 58 and the second printing surface 58 may be independently controlled while printing the first and second 3D objects. Next, at block 106, the 3D printing system 10 completes the first 3D object before completing the second 3D object. As will be appreciated, the method 94 may be repeated (e.g., in part or in its entirety) to continue producing 3D objects.

Technical effects of the invention include being able to stagger the timing of 3D object completion in a 3D printing system 10. The staggered timing may facilitate a steady flow of products from the 3D printing system 10 as compared to the batches produced by 3D printing systems having a single printing surface. Furthermore, fewer products may be produced with defects because defects may be detected in unfinished products and corrected in products that have not yet reached a defective stage of printing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A three-dimensional printing machine comprising:
a first build plate configured to hold a first three-dimensional object;
a second build plate configured to hold a second three-dimensional object; and
a first printing head and a second printing head disposed adjacent to the first and second build plates, respectively, for printing the first and second three-dimensional objects, wherein a vertical position of the first build plate is controlled independently from a vertical position of the second build plate.

2. The three-dimensional printing machine of claim 1, wherein the first printing head is configured to print the first three-dimensional object and the second printing head is configured to print the second three-dimensional object.

3. The three-dimensional printing machine of claim 1, wherein the three-dimensional printing machine is configured to finish printing the first three-dimensional object before printing of the second three-dimensional object is finished.

4. The three-dimensional printing machine claim 1, wherein the three-dimensional printing machine is configured to stagger completion of the first three-dimensional object and the second three-dimensional object.

5. The three-dimensional printing machine of claim 1, comprising first actuator for adjusting the vertical position of the first build plate, and a second actuator for adjusting the vertical position of the second build plate.

6. The three-dimensional printing machine of claim 1, comprising a first motor for adjusting the vertical position of the first build plate, and a second motor for adjusting the vertical position of the second build plate.

7. The three-dimensional printing machine of claim 1, comprising a control system configured to control the vertical position of the first build plate and the vertical position of the second build plate.

8. A method for printing a plurality of three-dimensional objects comprising:
printing a first three-dimensional object on a first build plate of a three-dimensional printing machine with a first printing head disposed adjacent to the first build plate;
printing a second three-dimensional object on a second build plate of the three-dimensional printing machine with a second printing head disposed adjacent to the second build plate; and
independently controlling a vertical position of the first build plate relative to a vertical position of the second build plate while printing the first and second three-dimensional objects.

9. The method of claim 8, comprising delaying printing of the second three-dimensional object on the second build plate for a predetermined period of time after printing of the first three-dimensional object has begun.

10. The method of claim 8, comprising completing printing of the first three-dimensional object before completing printing of the second three-dimensional object.

11. The method of claim 8, comprising adjusting the vertical position of the first build plate while printing the first three-dimensional object.

12. The method of claim 11, comprising adjusting the vertical position of the second build plate while printing the second three-dimensional object.

13. The method of claim 12, comprising adjusting the vertical position of the first build plate at substantially the same time as adjusting the vertical position of the second build plate.

14. The method of claim 12, comprising adjusting the vertical positions of the first and second build plates so the vertical positions of the first and second build plates are substantially the same.

15. The method of claim 12, comprising adjusting the vertical positions of the first and second build plates so the vertical positions of the first and second build plates are staggered.

16. A three-dimensional printing machine comprising:
a plurality of build plates configured to hold a plurality of three-dimensional objects;
a plurality of height adjustment devices coupled to the plurality of build plates, each of the plurality of height adjustment devices configured to independently adjust a vertical position of a corresponding build plate; and
a control system configured to control the plurality of height adjustment devices, and to control the at least one printing head, wherein each of the plurality of build plates has its own printing head disposed adjacent to it.

17. The three-dimensional printing machine of claim 16, wherein the control system is configured to stagger the printing of the plurality of three-dimensional objects to complete printing of the plurality of three-dimensional objects at different times.

18. The three-dimensional printing machine of claim 16, wherein the control system is configured to print the plurality of three-dimensional objects at the same time.

19. The three-dimensional printing machine of claim 16, wherein the control system is configured to restart printing of one of the plurality of three-dimensional objects when requested.

* * * * *